(12) United States Patent
Uchida

(10) Patent No.: US 7,817,651 B2
(45) Date of Patent: Oct. 19, 2010

(54) METHOD AND APPARATUS FOR CONTROLLING STORAGE OF DATA

(75) Inventor: Kenji Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 990 days.

(21) Appl. No.: 11/168,347

(22) Filed: Jun. 29, 2005

(65) Prior Publication Data

US 2006/0034307 A1 Feb. 16, 2006

(30) Foreign Application Priority Data

Aug. 10, 2004 (JP) ............................. 2004-233387

(51) Int. Cl.
*H04L 12/54* (2006.01)
*G06F 3/00* (2006.01)
(52) U.S. Cl. ..................... 370/412; 370/429; 710/36
(58) Field of Classification Search ................. 370/412, 370/429; 710/36
See application file for complete search history.

(56) References Cited

U.S. PATENT DOCUMENTS

| | | | | |
|---|---|---|---|---|
| 5,227,876 A | * | 7/1993 | Cucchi et al. ............... | 370/235 |
| 6,052,375 A | * | 4/2000 | Bass et al. ................... | 370/412 |
| 6,052,738 A | * | 4/2000 | Muller et al. ................ | 709/250 |
| 6,111,880 A | * | 8/2000 | Rusu et al. ............. | 370/395.53 |
| 6,292,875 B1 | * | 9/2001 | Tanaka et al. ................ | 711/154 |
| 6,510,138 B1 | * | 1/2003 | Pannell ........................ | 370/236 |
| 6,636,483 B1 | * | 10/2003 | Pannell ........................ | 370/236 |
| 6,738,880 B2 | * | 5/2004 | Lai et al. ..................... | 711/167 |
| 6,944,186 B2 | * | 9/2005 | Zaun et al. ................... | 370/487 |
| 7,068,653 B2 | * | 6/2006 | Lespagnol ................... | 370/390 |
| 7,216,185 B2 | * | 5/2007 | Kato ............................ | 710/52 |
| 7,349,332 B1 | * | 3/2008 | Srinivasan et al. ........... | 370/229 |
| 7,499,400 B2 | * | 3/2009 | Davies et al. ................ | 370/235 |
| 7,535,835 B2 | * | 5/2009 | Davies et al. ................ | 370/230 |
| 2003/0133457 A1 | * | 7/2003 | Ono et al. ................. | 370/395.4 |
| 2004/0196855 A1 | * | 10/2004 | Davies et al. ........... | 370/395.42 |
| 2005/0141503 A1 | * | 6/2005 | Welfeld ....................... | 370/392 |

* cited by examiner

*Primary Examiner*—Alpus H Hsu
(74) *Attorney, Agent, or Firm*—Staas & Halsey LLP

(57) ABSTRACT

A data queue controlling apparatus including a plurality of input interfaces and a method of controlling the data queue controlling apparatus is provided. The apparatus performs effective data queue controlling without use of a single common data queue and solves the problems in LSI yield, operation frequency and power consumption by providing a plurality of data queues which are less than the number of input interfaces and also providing a means for equally sharing the packet data inputted from each input interface to each data queue.

5 Claims, 13 Drawing Sheets

FIG. 9

|  | RAM-0 | RAM-1 | RAM-2 |
|---|---|---|---|
| BLOCK-0 | x0 + x1 | x2 + x3 | DON'T CARE |
| BLOCK-1 | y0 + y1 | y2 + y3 | DON'T CARE |
| BLOCK-2 | y2' + y3' | y4' + y5' | y0' + y1' |
| BLOCK-3 | DON'T CARE | DON'T CARE | DON'T CARE |
| BLOCK-4 | DON'T CARE | DON'T CARE | DON'T CARE |
| BLOCK-5 | DON'T CARE | DON'T CARE | DON'T CARE |
| BLOCK-6 | DON'T CARE | DON'T CARE | DON'T CARE |
| BLOCK-7 | DON'T CARE | DON'T CARE | DON'T CARE |
| BLOCK-8 | DON'T CARE | DON'T CARE | DON'T CARE |
| BLOCK-9 | DON'T CARE | DON'T CARE | DON'T CARE |
| BLOCK-10 | DON'T CARE | DON'T CARE | DON'T CARE |
| ⋮ | ... | ... | ... |
| BLOCK-n | DON'T CARE | DON'T CARE | DON'T CARE |

|  | RAM-0 | RAM-1 | RAM-2 |
|---|---|---|---|
| BLOCK-0 | o0 + o1 | o2 + o3 | o4 + o5 |
| BLOCK-1 | p0 + p1 | p2 + p3 | p4 + p5 |
| BLOCK-2 | q0 + q1 | q2 + q3 | q4 + q5 |
| BLOCK-3 | r0 + r1 | r2 + r3 | r4 + r5 |
| BLOCK-4 | s0 + s1 | s2 + s3 | s4 + s5 |
| BLOCK-5 | o0' + o1' | o2' + o3' | o4' + o5' |
| BLOCK-6 | p0' + p1' | p2' + p3' | p4' + p5' |
| BLOCK-7 | q0' + q1' | q2' + q3' | q4' + q5' |
| BLOCK-8 | r0' + r1' | r2' + r3' | r4' + r5' |
| BLOCK-9 | s0' + s1' | s2' + s3' | s4' + s5' |
| BLOCK-10 | o0" + o1" | o2" + o3" | o4" + o5" |
| ... | ... | ... | ... |
| BLOCK-n | DON'T CARE | DON'T CARE | DON'T CARE |

FIG. 12

METHOD AND APPARATUS FOR CONTROLLING STORAGE OF DATA

CROSS-REFERENCE TO RELATED APPLICATIONS

This application claims the benefit of Japanese Application No. 2004-233387, filed Aug. 10, 2004, in the Japanese Intellectual Property Office, the disclosure of which is incorporated herein by reference.

FIELD OF THE INVENTION

The present invention relates to a controlling apparatus and method for storing data strings such as packets or frames. The data strings are inputted from a plurality of input interfaces to data queues formed of buffers, FIFOs, or RAMs, etc. in crossbar switches and system controllers, etc., in which chip sets, such as server and PC, are included and a plurality of input and output interfaces are included.

BACKGROUND OF THE INVENTION

In the conventional computer systems, a CPU local bus which is connected with a CPU and main memory or the like and an I/O bus connected with an I/O interface have been connected with a bus bridge. In such a conventional computer system, a large scale system hardware structure has not yet been realized, and one CPU local bus has principally been connected to one I/O interface, namely on the basis of the 1:1 relationship for the interface bridged with a bus bridge.

Thereafter, in a computer system, such as a server which is required to assure particularly higher processing capability like basic business processes in enterprises, the processing capability has been improved by interconnecting a plurality of processors. This is accomplished by realizing a structure of the large scale SMP (Symmetrical Multi-Processor) type. In the computer system of such a large scale SMP structure, the connecting structure provides a relationship of n:1 or n:m (n, m: natural number) of one I/O interface or a plurality of I/O interfaces for one I/O interface, or a plurality of I/O interfaces for a plurality of CPU local buses has been required. Accordingly, the conventional bus bridge has been replaced with a crossbar switch and a system controller for supporting a plurality of interfaces. In the crossbar switches or the like, there has been provided a storage structure including a data queue for a plurality of input interfaces.

However, the method for providing a data queue for every group of input interfaces is not effective because the number of data queues such as buffers, FIFOs, or RAMs increases as the number of input interfaces increases and the results in a problem in the development of crossbar switches or the like to realize a computer system of larger scale.

FIG. 5 illustrates an example of a conventional data queue controlling apparatus including a plurality of input interfaces of an identical type. The data queue controlling apparatus of FIG. 5 includes, as the input interface, the interfaces IF0 to IF4 of the identical type. The apparatus receives the packet data 511 of a 4-byte width outputted from the other Large Scale Integrations (LSIs) and output IF 5 as an input interface.

The packet data 511 of the 4-byte width inputted to each interface of IF0 to IF4 is coupled to the packet data of an 8-byte width in which the even number packet data and following odd number packet data are arranged with buffers 521 to 525. The coupled packet data of 8-byte width is queued to the RAMs 531 to 535 of 8-byte width forming a data queue. The packet data of 8-byte width queued to the RAMs 531 to 535 are converted again to two packet data of 4-byte width with conversion buffers 541 to 545.

The converted packet data of 4-byte width is respectively inputted to the inputs IN0 to IN4 of a multiplexer 561. The packet data inputted to the multiplexer 561 is selected with a priority controller 551 and thereby outputted to the IF 5. At the IF 5, the priority controller 551 determines priority, such as IN0→IN1→IN2→IN3→IN4→IN1.

As described above, the conventional data queue controlling apparatus has controlled the queuing of packet data by providing a data queue corresponding to the input interface on a 1:1 basis. However, the amount of input of packet data from each input interface has not always been uniform, and therefore, loading the data queue corresponding to each input interface on a 1:1 basis has not yet been effectively performed.

Japanese patent publication No. 3452424 relates to a common buffer memory controlling apparatus, such as an ATM switching apparatus. The publication particularly discloses a common buffer memory controlling apparatus which is suitable for message communication services for transferring one message data consisting of a plurality of cells. Japanese patent publication No. 3452424 discloses a common buffer memory controlling apparatus for storing message data via separation into a plurality of cells within the common buffer memory, which is formed of a single buffer memory as the data queue. However, Japanese patent publication No. 3452424 discloses technology for storing all message data into the buffer memory as the identical data queue. Thus, the effective queuing method of packet data for certain data queues formed of a number which is less than the number of input interfaces is not disclosed in the patent document.

Because the data queue of a buffer or a RAM of a large capacity requires a larger area, manufacturing yield of semiconductors is lowered. In addition, a logical amount of address decoders becomes large. Thus, for example, it is sometimes preferential, from the viewpoint of yield of LSI, operating frequency, and power consumption thereof, to form the data queue of a constant amount by utilizing the data queues of a plurality of buffers or RAMs of an intermediate capacity rather than to form only one buffer or RAM of the larger capacity. In addition, such a data queue becomes inferior to the data queue of a buffer or a RAM of the intermediate capacity in operation frequency and power consumption. The terms large capacity and intermediate capacity do not indicate a quantitative concept but rather a relative concept, which is determined by the amount of packet data inputted to the data queue controlling apparatus and the progress of semiconductor technology.

Japanese patent publication No. 3452424 does not disclose an effective method of controlling data queues.

BRIEF DESCRIPTION OF THE DRAWINGS

FIG. 9 is a diagram illustrating an example of a timing chart in the first embodiment of the present invention.

FIG. 10 is a diagram illustrating a data packet storing image of RAM in the first embodiment.

FIG. 11 is a diagram illustrating an example of a timing chart in the first embodiment.

FIG. 12 is a diagram illustrating a data packet storing image of RAM in the first embodiment of the present invention.

BRIEF DESCRIPTION OF EMBODIMENTS OF THE INVENTION

Figure 1:
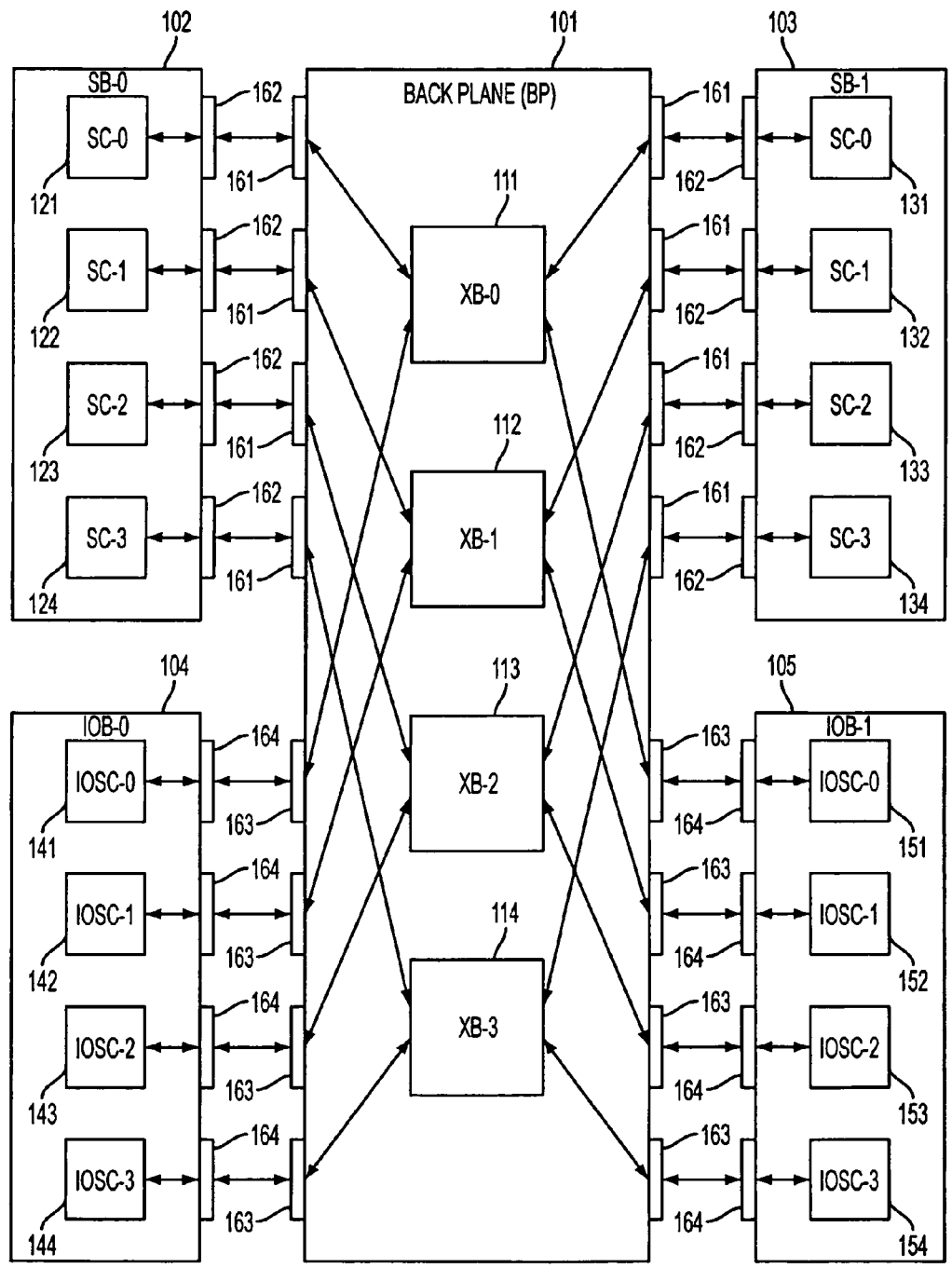
FIG. 1 is a diagram illustrating a structure example of the total hardware of a computer system using a crossbar switch LSI (XB), a system controller LSI (SC) and an I/O system controller (IOSC) LSI.

In the conventional technology, influence on manufacturing yield, operation frequency, and power consumption of LSIs has been a problem. When data queues of the buffer or RAM or the like is provided corresponding to a plurality of input interfaces on a 1:1 basis in the data queue controlling apparatus for storing packet data from a plurality of input interfaces, effective data queue control is difficult due to unequal input of packet data from the input interface. Capacity of common data queues becomes large if the single common data queue is provided. Accordingly, considering that a plurality of input interfaces are interfaces of the same kind, an effective data queue controlling method is realized without use of a single common data queue by mounting a plurality of data queues formed of a number less than the number of input interfaces. In addition, a means for uniformly sharing the packet data with a plurality of data queues is provided. According to this method, since it is not required to use a single common data queue, the problem of manufacturing yield, operation frequency, and power consumption of LSI can be eliminated.

The present invention provides a data queue controlling apparatus and a controlling method which can save physical data queues by providing, a means for using the data queues in common for the purpose of queuing, considering that a plurality of input interfaces to be connected are interfaces of the same kind.

According to at least one embodiment of the present invention, a data queue controlling apparatus and method is provided. The method includes receiving data from a plurality of input interfaces, storing the received data into a plurality of data queues, and selectively outputting the data stored in a plurality of data queues with a selective outputting means. The apparatus includes an assigning device for sequentially assigning the data respectively received from a plurality of input interfaces to a plurality of data queues.

According to at least one embodiment of the present invention, an information processing apparatus is provided, and includes a data queue controlling apparatus. The data queue controlling apparatus receives the data from a plurality of input interfaces, stores the received data into a plurality of data queues, and selectively outputs the data stored in a plurality of data queues with the a selective outputting approach and processes outputs from the data queue controlling apparatus. The information processing apparatus further includes an assigning device for sequentially assigning the data received respectively from a plurality of input interfaces to a plurality of data queues in order to process the data outputted from the same data queue controlling apparatus.

According to at least one embodiment of the present invention, a data queue controlling method receives data from a plurality of input interfaces, stores the received data to a plurality of data queues, and selectively outputs the data stored in the plurality of data queues. The data queue controlling method includes, inputting the data from a plurality of input interfaces, sequentially assigning the data received from a plurality of input interfaces to a plurality of data queues, and selectively outputting the data assigned to a plurality of data queues.

According to at least one embodiment of the present invention, a data queue controlling apparatus receives data from a plurality of input interfaces, stores the received data into a plurality of data queues, and selectively outputs the data stored in a plurality of data queues. The data queue controlling apparatus includes a plurality of multiplexers respectively provided corresponding to all data queues and connected to all input interfaces and any of the data queues.

According to at least one embodiment of the present invention, the invention includes an information processing apparatus including a data queue controlling apparatus for receiving data from a plurality of input interfaces, storing the received data to a plurality of data queues, and selectively outputting the data stored in the plurality of data queues and processing the outputs from the data queue controlling apparatus. The data queue controlling apparatus further includes a plurality of multiplexers respectively provided corresponding to all data queues and connected to all input interfaces and the data queues to process the data outputted from the data queue controlling apparatus.

According to at least one embodiment of the present invention, a data queue controlling apparatus receives data from M (M is a natural number equal to or larger than 2) input interfaces and stores the received data to N (N is a natural number equal to or larger than 2 and equal to or less than M) data queues. The data queue controlling apparatus includes a first priority controlling device for controlling priority with an output from a first counting device to conduct the counting from 0 to (M−1), a second priority controlling device for controlling priority with an output of a second counting device for counting from 0 to (N−1), N M:1-selecting device connected to the M input interfaces to realize selective output with the selection signal outputted from the first priority controlling device, N data queues respectively connected to the outputs of the N M:1-selecting devices on the 1:1 basis, and an N:1-selecting means connected to the outputs of the N data queues to realize selective output with the selection signal outputted from the second priority controlling device.

According to at least one embodiment of the present invention, the data queue controlling apparatus further comprises M sustaining buffers coupling data blocks which are respectively connected to the input interface means to output the coupled data respectively to the data queues.

According to at least one embodiment of the present invention, the data queue controlling apparatus further comprises a plurality of N:1-selecting devices.

According to at least one embodiment of the present invention, a data queue controlling method for receiving the data from the M (M is a natural number equal to or larger than 2) input interface devices and storing the received data to the N (N is a natural number equal to or larger than 2 and equal to or less than M) data queues. The data queue controlling apparatus further includes, a first priority controlling device for controlling priority with an output from a first counting device for counting from 0 to (M−1), and a second priority controlling device for controlling priority with an output from a second counting device for counting from 0 to (N−1). The data queue controlling apparatus inputs the data with the M input interfaces, selects respective data with the N M:1-selecting devices for selecting the data inputted from the input interfaces with the selecting signal outputted from the first priority controlling devices, stores the data selected with the N M:1-selecting devices to the N data queues connected respectively on a 1:1 basis, selectively outputs the data with the N:1 selecting devices, which inputs the data outputted from the N data queues, and selects the data with the selecting signal outputted from the second priority controlling device.

According to at least one embodiment of the present invention, a data queue controlling apparatus includes a buffer for coupling a plurality of data blocks to one data block. The buffer output the coupled data, to the data queue after coupling the data inputted from the input interface.

As described above, according to the present invention, the data queue controlling apparatus includes a plurality of input interfaces. The method of controlling the data queue utilizes a plurality of data queues formed in a number less than the number of input interfaces and a device for uniformly sharing the packet data inputted from each input interface with each data queue. As a result, an effective data queue controlling apparatus and method are realized without use of a single common data queue. Thus, the problems of manufacturing yield, operation frequency, and power consumption of LSIs are reduced or eliminated.

DETAILED DESCRIPTION OF THE PREFERRED EMBODIMENTS

The first and second embodiments of the present invention will be described in detail with reference to the accompanying drawings.

First Embodiment

FIG. 1 illustrates an example of a complete hardware structure of a computer system utilizing a crossbar switch (XB) LSI, a system controller (SC) LSI and an I/O system controller (IOSC) LSI.

A back plane (BP) 101 is provided with a plurality of crossbar switches (XB) LSIs 111 to 114 and controls connections of the system as a whole through connectors 161 to 164 by providing interfaces with system boards (SB) 102, 103 and I/O boards (IOB) 104, 105. The system boards (SB) 102, 103 respectively mount a plurality of system controller LSIs (SC) 121 to 124, 131 to 134, a plurality of CPUs, and a memory controller (MAC) LSI for controlling a main memory (The CPU and memory controller (MAC) LSI are not illustrated in the figure). The system controller (SC) LSI includes the other system controller (SC) LSI mounted on the system board (SB) and interfaces with a plurality of CPUs and memory controller (MAC) LSIs (details will be described herein below). Therefore, the system boards (SB) 102, 103 are considered as a unit of expansion of the processing capability in the relevant computer system. The I/O boards (IOB) 104, 105 respectively mount a plurality of I/O system controller (IOSC) LSIs 141 to 144, 151 to 154 and PCI slots or the like (PCI slots or the like are not illustrated in the figure). Accordingly, the I/O boards (IOB) 104, 105 are considered as a unit of expansion of I/O in the relevant computer system.

Figure 2:
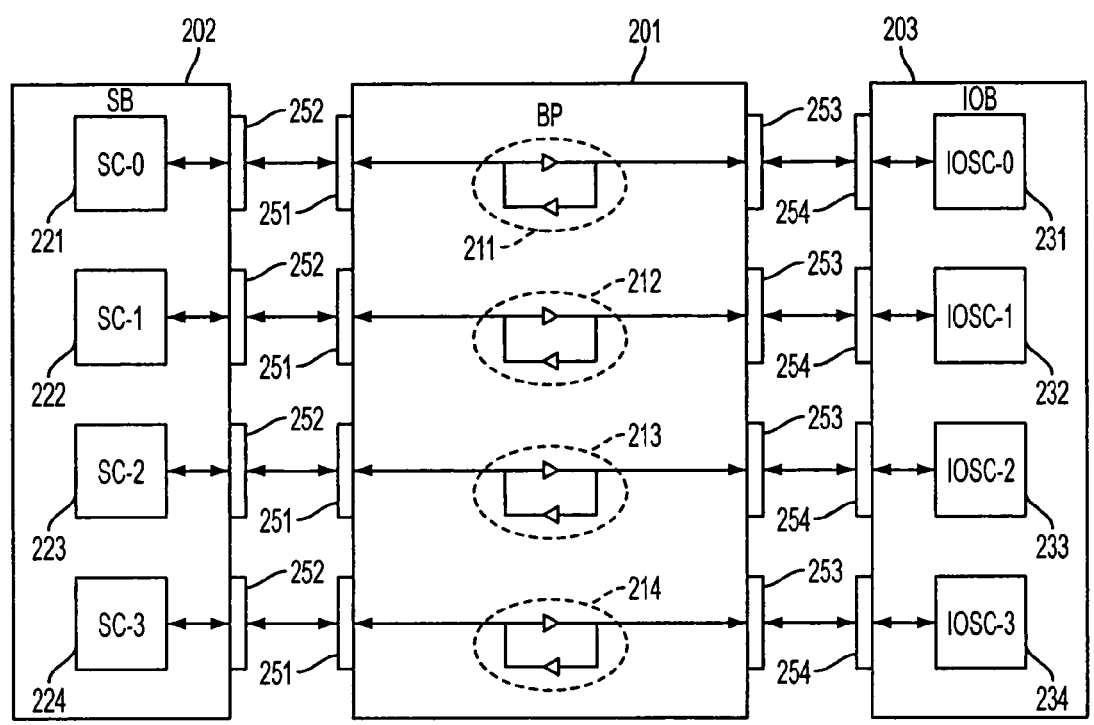
FIG. 2 is a diagram illustrating a structure example of total hardware of the computer system using the system controller (SC) LSI and the I/O system controller (IOSC) LSI.

Moreover, FIG. 2 illustrates an example of a complete hardware structure of a computer system as a whole utilizing a system controller (SC) LSI and an I/O system controller (IOSC) LSI as the applicable product field of the present invention. In this example, a crossbar (XB) switch LSI is not used.

The back plane (BP) 201 mounts a plurality of transceivers 211 to 214 and controls connections of the system as a whole through connectors 251 to 254 by providing interfaces with a system board (SB) 202 and an I/O board (IOB) 203. The system board (SB) 202 mounts a plurality of system controller (SC) LSIs 221 to 224, a plurality of CPUs, and a main memory controller (MAC) LSI for controlling a main memory (CPU and memory controller (MAC) LSI or the like are not illustrated). The system controller (SC) LSI includes another system controller (SC) LSI mounted on the system board (SB), a plurality of CPUs, and an interface with memory (details will be described later). Accordingly, the system board (SB) 202 is a unit of expansion of processing capability in the relevant computer system. The I/O board (IOB) 203 mounts a plurality of I/O system controller (IOSC) LSIs 231 to 234 and a PCI slot or the like (In the figure, the PCI slot or the like is not illustrated). Therefore, the I/O board (IOB) 203 a unit of expansion of I/O in the relevant computer system.

Figure 3:
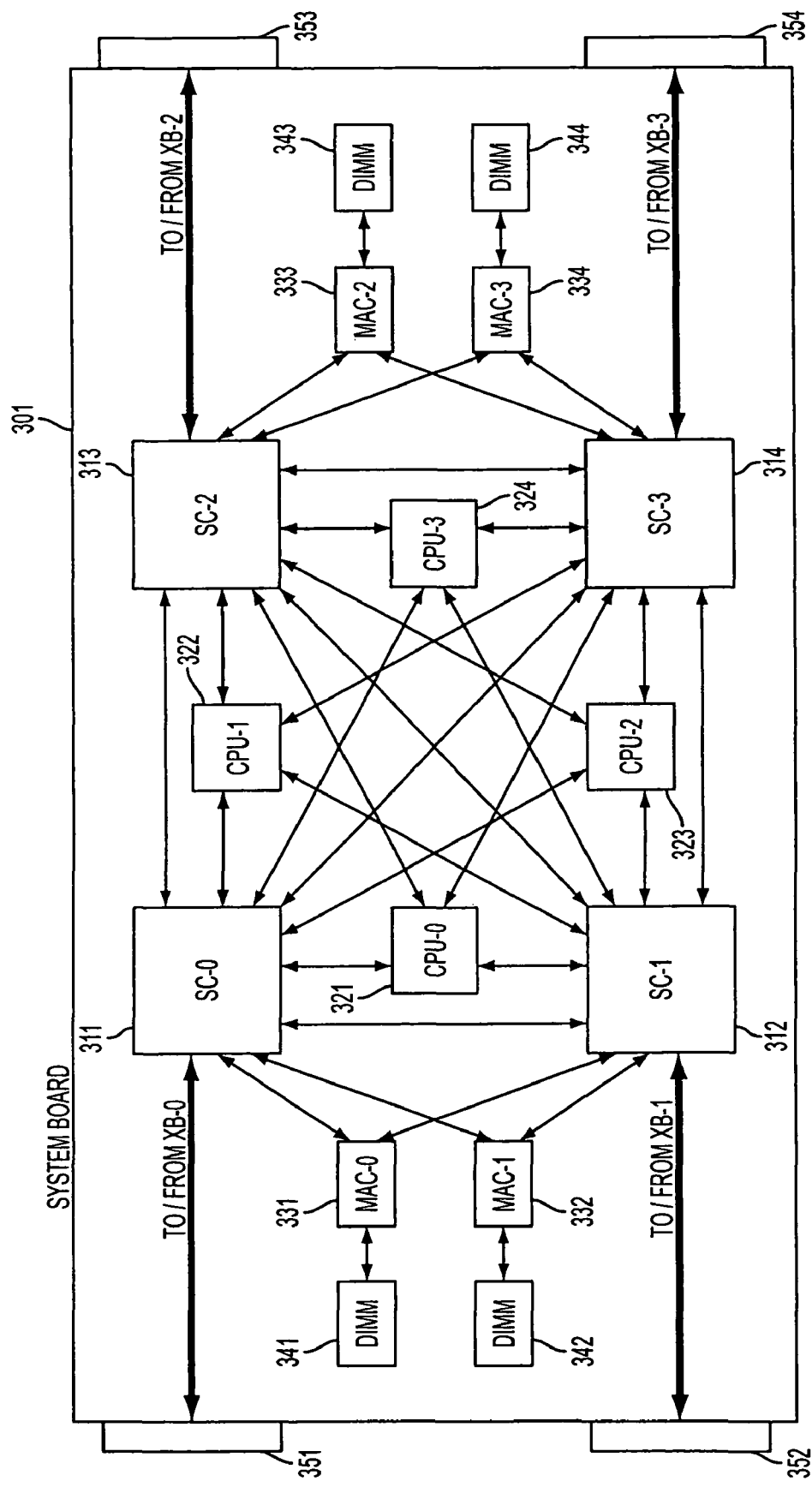
FIG. 3 is a diagram illustrating a structure example of hardware of a system board (SB) to mount the system controller (SC) LSI.

FIG. 3 illustrates an example of a hardware structure of the system board (SB) for mounting the system controller (SC) LSI.

The system board (SB) 301 mounts a plurality of system controller (SC) LSIs 311 to 314, a plurality of CPUs 321 to 324, a plurality of memory controller (MAC) LSI 331 to 334, a plurality of memory modules (DIMM) 341 to 344, and a plurality of connectors 351 to 354.

Here, an example of the system controller LSI 311 will be described. The system controller (SC) LSI 311 is connected with the another system controller (SC) LSIs 312 to 314, a plurality of CPUs 321 to 324, and a plurality of memory controller (MAC) LSIs 331, 332. In addition, the system controller (SC) LSI 311 has an interface with the crossbar switch (XB) LSI mounted on the back plane via a connector 351. Therefore, the system controller (SC) LSI 311 performs data transmission and reception with the CPUs and memory controllers (MAC) connected to the system controller (SC) LSI.

The system controller (SC) LSI 311 is connected with the CPUs 321 to 324 with an interface of the CPU local bus type, and with the memory controller LSIs 331, 332 via an interface of the memory bus type, and with the other system controller (SC) LSIs 312 to 314 via an interface of the inter-connect type. Moreover, the system controller (SC) LSI 311 is connected with a crossbar switch (XB) LSI via an interface of the inter-connect type. In general, an interface of the inter-connect type for the system controller (SC) LSI is used for connection.

Figure 4:
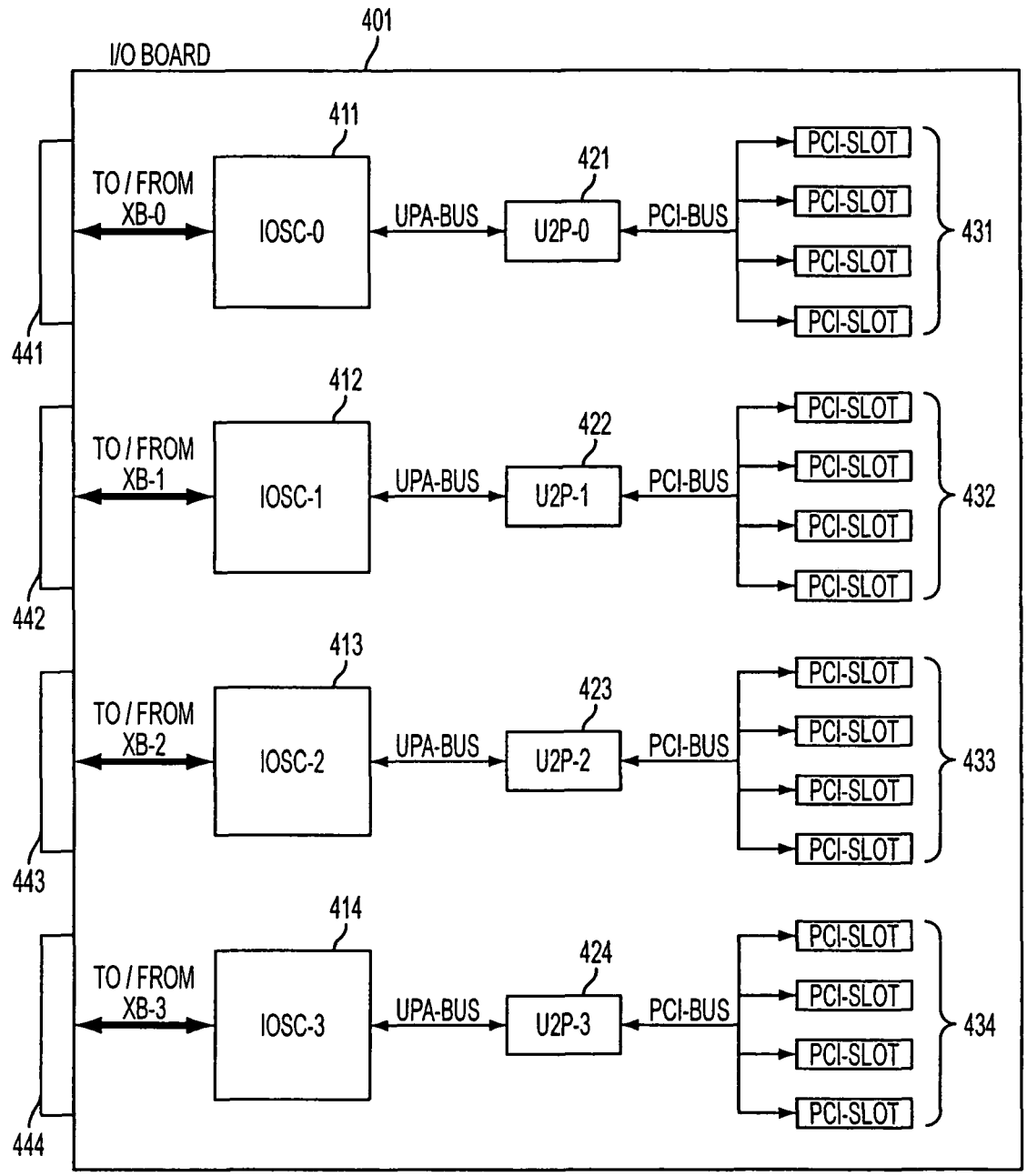
FIG. 4 is a diagram illustrating a structure example of hardware of an I/O board (IOB) for mounting the I/O system controller (IOSC) LSI.
Figure 5:
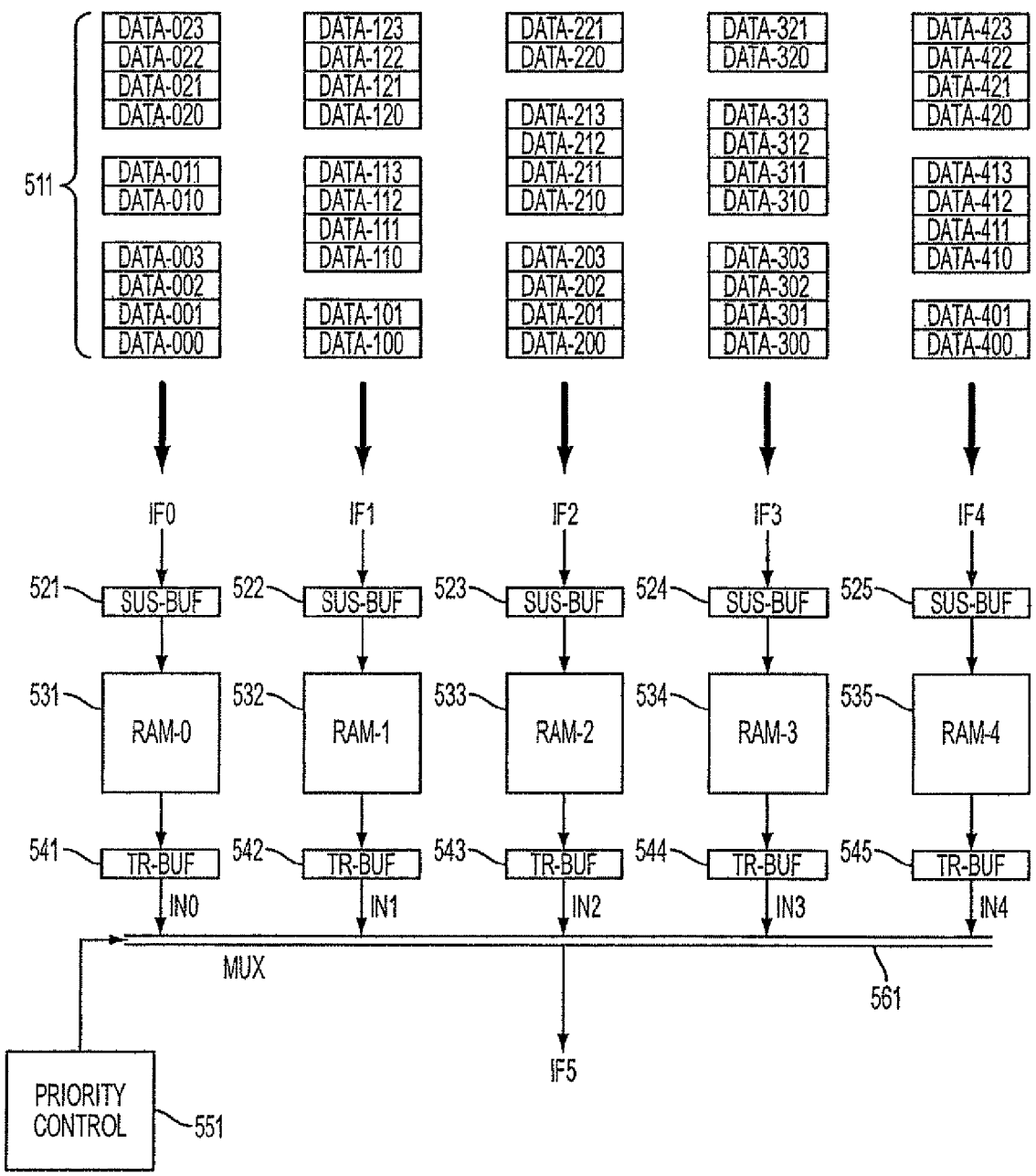
FIG. 5 is a diagram illustrating a conventional data queue controlling apparatus comprising a plurality of input interfaces of an identical type.

In addition, FIG. 4 illustrates an example of the hardware structure of the I/O board (IOB) mounting the I/O system controller (IOSC) LSI.

The I/O board (IOB) 401 mounts a plurality of I/O system controller (IOSC) LSIs 411 to 412, a plurality of UPA-PCI bridge (U2P) LSIs 421 to 424, a plurality of PCI slots 431 to 434, and a plurality of connectors 441 to 444.

The I/O system controller (IOSC) LSIs 411 to 414 are also provided with an interface with the crossbar switch (XB) LSI mounted on the back plane via the connectors 441 to 444, and additionally with an interface with the UPA-PCI bridge LSI (U2P). A bridge LSI is formed between the inter-connect and the UPA bus through interface conversion between the inter-connect and the UPA bus.

Moreover, the UPA-PCI bridge forms a bridge LSI between the UPA bus and the PCI bus through the interface conversion between the UPA bus and the PCI bus and performs data transmission and reception with the PCI cards mounted on the PCI slots (PCI-slot) 431 to 434.

As described above, in the computer system of the large scale SMP structure, the crossbar switch (XB) LSI and the system controller (SC) LSI have a plurality of interfaces for the other LSIs. Moreover, a plurality of interfaces are formed of several kinds of interfaces for every kind of the partner LSIs for connections. In other words, the same kind of interfaces are provided for the same kind of LSIs.

Figure 6:
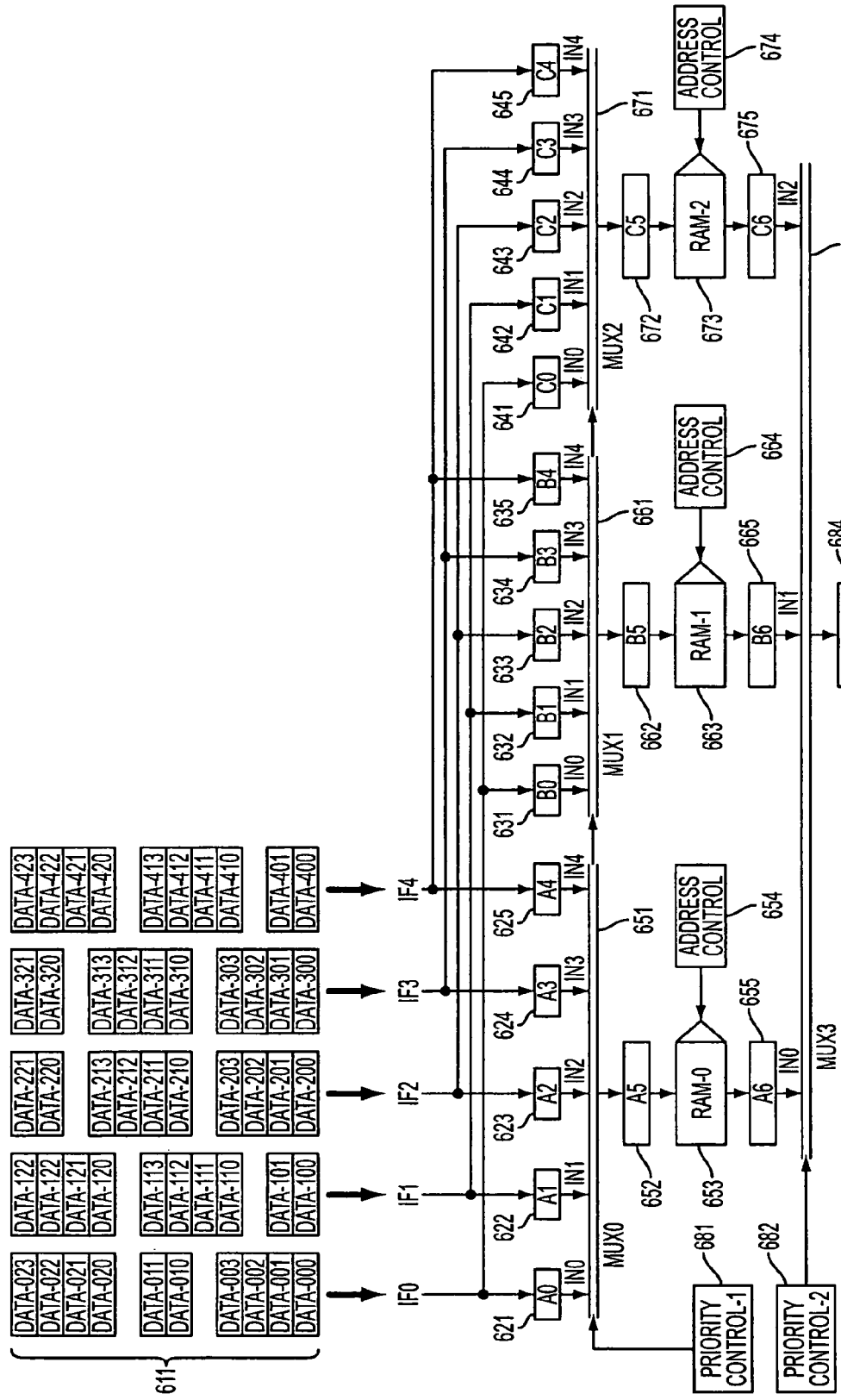
FIG. 6 is a diagram illustrating a first embodiment of the present invention.

FIG. 6 illustrates a first embodiment of the present invention in the data queue controlling apparatus including a plurality of interfaces of the same kind.

The data queue controlling apparatus of FIG. 6 includes the interfaces IF0 to IF4 of the same kind as the input. These interfaces IF0 to IF4 receive the packet data 611 of the 4-byte width outputted from the other LSIs and provide outputs to the IF5 as the output interface.

The packet data 611 of the 4-byte width inputted to each interface IF0 to IF4 is coupled to the even numbered packet data and the subsequent packet data of 8-byte width in which the odd number packet data are arranged with the buffers 621 to 625, 631 to 635, and 641 to 645 whenever the data reaches 8 bytes. For example, the packet data inputted to the IF0 is coupled, whenever the data reaches 8 bytes, to the packet data of 8-byte width in the sequence of the sustaining buffer (A0) 621→sustaining buffer (B0) 631→sustaining buffer (C0) 641. Details of the buffer will be described later.

As an example, when a header of the packet destination information or the like is mounted or allocated to the even numbered packet data and the principal packet data is mounted to the subsequent odd number packet data as the format to constitute two packet data of 4-byte width, the packet data read from the data queue can be controlled by storing the packet data into the data queue after coupling the data to the coupled packet data of 8-byte width.

The coupled packet data of 8-byte width is respectively inputted to IN0 to IN4 of a multiplexer circuit (MUX0) 651, a multiplexer circuit (MUX1) 661 and a multiplexer circuit (MUX2) 671. The multiplexer circuits (MUX0 to MUX2) 651 to 671, respectively select the coupled packet data inputted from the IN0 to IN4 of respective multiplexer circuits with the select signal outputted from a first priority control circuit (PRIORITY CONTROL-1) 681 and respectively provides the outputs to the write data buffer (A5) 652 or to the write data buffer (B5) 662 or to the write data buffer (C5) 672.

Here, the first priority control circuit 681 performs priority control on the basis of a round robin method controlled by a counter circuit. Here, the priority control based on round robin method is the method for periodically changing the priority sequence using a counter value.

For example, according to this method, when a count value changes to 0→1→2→3→4→5→0→ in the multiplexer circuit (MUX0) 651, the input is selected as IN0→IN1→IN2→IN3→IN4→(non-selection)→IN0. Moreover, in the multiplexer circuit (MUX1) 661, when the count value changes to 0→1→2→3→4→5→0, the input is selected as IN2→IN3→IN4→(non-selection)→IN0→IN1→IN2. Moreover, in the multiplexer circuit (MUX2) 671, when the count value changes to →1→2→3→4→5→0, the input is selected as IN4→(non-selection)→IN0→IN1→IN2→IN3→IN4.

The coupled packet data stored in the write data buffer (A5) 652, write data buffer (B5) 662, and write data buffer (C5) 672 are stored in RAM (RAM-0) 653, RAM (RAM-1) 663; or RAM (RAM-2) 673 which will respectively become data queues when data is written to the write address outputted from the address control circuits 654, 664, and 674.

The coupled packet data stored in the RAM (RAM-0) 653, RAM (RAM-1) 663, and RAM (RAM-2) 673 are respectively held in the read data buffer (A6) 655, read data buffer (B6) 665, or read data buffer (C6) 675.

The coupled packet data held in the read data buffer (A6) 655, read data buffer (B6) 665, or read data buffer (C6) are respectively inputted to IN0 to IN2 of the multiplexer circuit (MUX3) 683.

The multiplexer circuit (MUX3) 683 selects the coupled packet data inputted from the IN0 to IN2 with the select signal outputted from a second priority control circuit (PRIORITY CONTROL-2) and provides an output to a transforming buffer (TR-BUF) 684.

The second priority control circuit (PRIORITY CONTROL-2) 682 performs the priority sequence control with the round robin method.

For example, the multiplexer circuit (MUX3) 683 selects input such as IN0→IN1→IN2→(non-selection)→IN0 as the count value changes as →0→1→2→3→0, for example.

Moreover, in the transforming buffer (TR-BUF) 684, the coupled packet data is converted to two packet data of the 4-byte width and is then outputted from the IF 5 as the output interface of the data queue controlling apparatus. Details of the transforming buffer will be described later.

According to the embodiments of the present invention, the data queue controlling apparatus and method including a connection relationship of n:1 (n is a natural number) is realized.

As an example of the assigning device of the present invention, there is provided a structure comprising the multiplexer circuit (MUX0) 651, multiplexer circuit (MUX1) 661, and multiplexer circuit (MUX2) 671 and the first priority control circuit (PRIORITY CONTROL-1) of the first embodiment. However, the practical structure is not limited thereto, and the present invention also includes structure which is changed or modified within the scope of the subject matter of the present invention.

Operations of Sustaining Buffer

Figure 7:
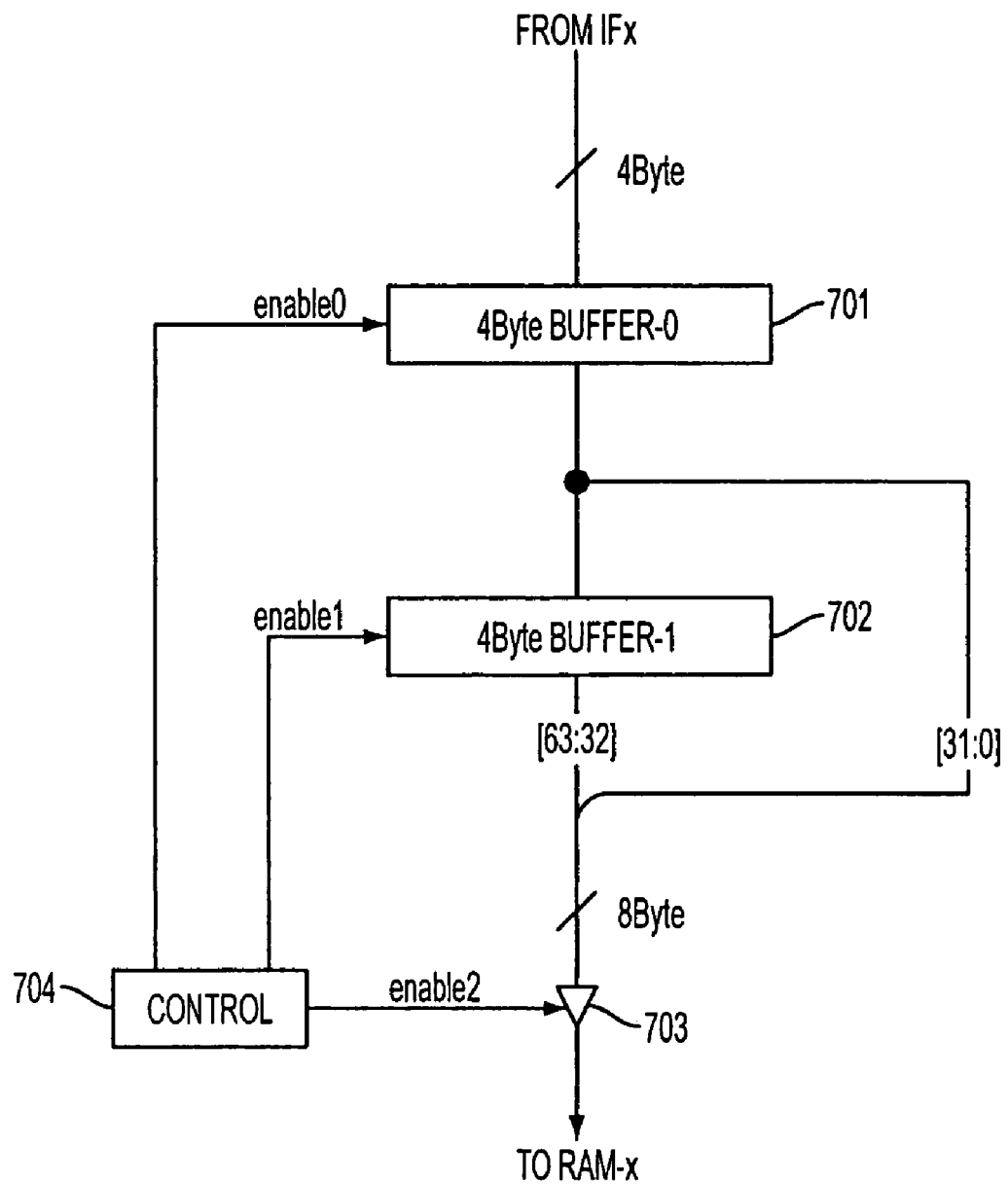
FIG. 7 is a diagram illustrating details of a sustaining buffer.

FIG. 7 illustrates details of the sustaining buffer. The sustaining buffer couples the input packet data of the 4-byte width, whenever the data reaches 8-bytes, to the packet data of the 8-byte width in which the even numbered packet data and following odd number packet data are arranged or coupled.

First, the even numbered packet data of 4-byte width is stored first in a first 4-byte buffer (4 Byte BUFFER-0) 701 through the control of the enable signals (enable 0, enable 1) from a controller 704 and is stored in a second 4-byte buffer (4 Byte BUFFER-1) 702 in the next cycle. Moreover, the even numbered packet data of 4-byte width following the even numbered packet data is stored in the first 4-byte buffer 701.

Here, the output bit 63:62 of the first 4-byte buffer 701 and the output bit 31:0 of 702 are merged and thereby coupled to the data of the 8-byte width of the bit 63:0. Moreover, the coupled 8-byte width data is outputted from a tristate buffer 703 with the enable signal from the controller 704. It can be understood that two packet data of 4-byte width are coupled to the packet data of 8-byte width with the operations described above.

Operations of Transforming Buffer

Figure 8:
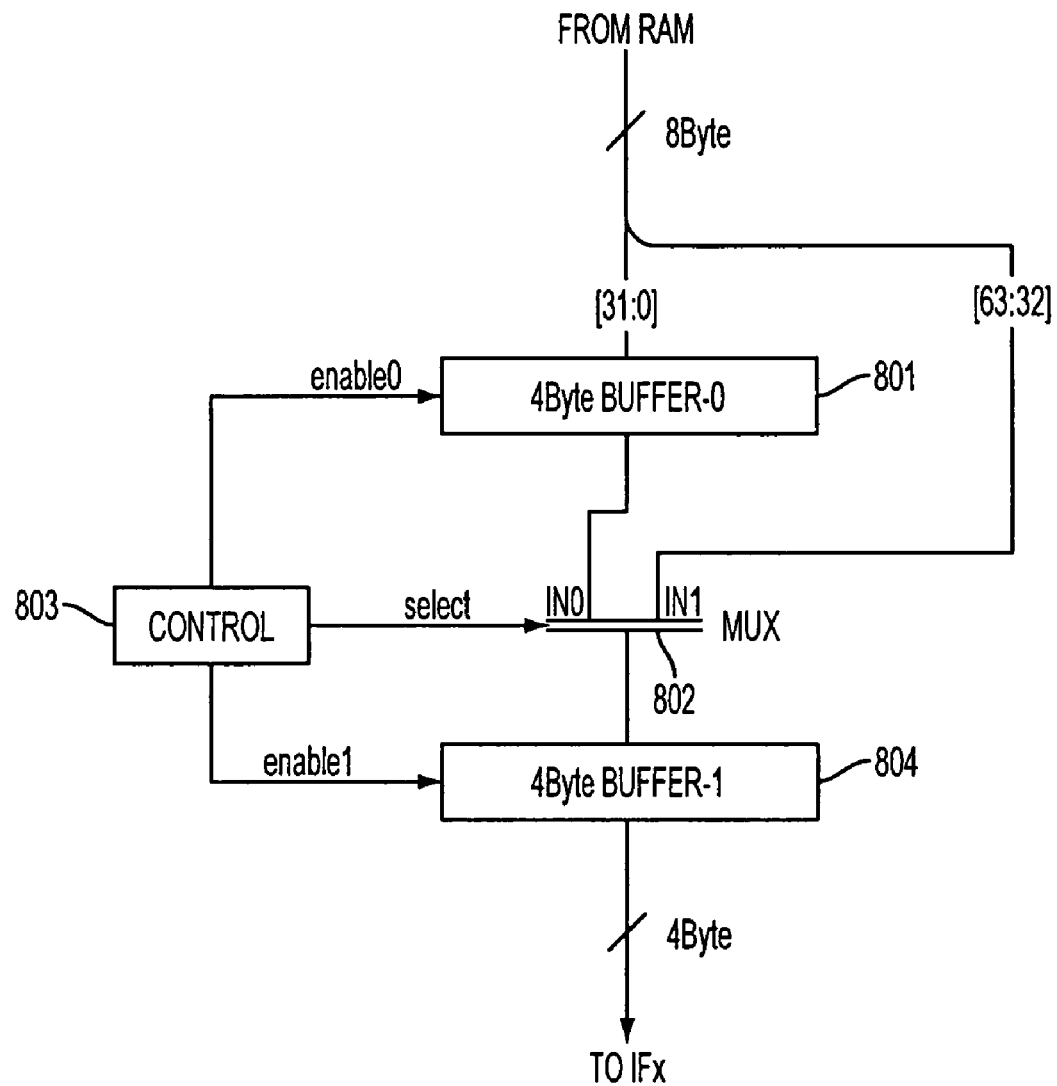
FIG. 8 is a diagram illustrating details of a transforming buffer.

FIG. 8 is a diagram illustrating details of the transforming buffer. The transforming buffer transforms the input coupled packet data of 8-byte width into two packet data of 4-byte width.

First, the coupled packet data of 8-byte width is controlled with the enable signal and select signal (enable0, select, enable1). Thereby, the bit 31:0 of the coupled packet data is stored to a first 4-byte buffer (4 Byte BUFFER-0) 801 with the enable 0 signal. Moreover, the bit 63:32 of the coupled packet data is stored to a second 4-byte buffer (4 Byte BUFFER-1) 804 by selecting the IN1 input of the multiplexer circuit (MUX) 802 with the select signal.

Here, after the bit 63:32 of the coupled packet data is stored in the second 4-byte buffer (4 Byte BUFFER-1) 804, the packet data of 4-byte width of the bit 63:32 is outputted in the next cycle by selecting the IN0 input of the multiplexer circuit (MUX) 802. The selection is accomplished with the select signal from the controller, and the bit 31:0 is stored to the second 4-byte buffer (4 Byte BUFFER-1) 804. In addition, in the next cycle, the packet data of 4-byte width of the bit 31:0 is outputted. With the operations described above, the coupled packet data of 8-tyte width is transformed to two packet data of 4-byte width.

Timing Chart

Figure 9:
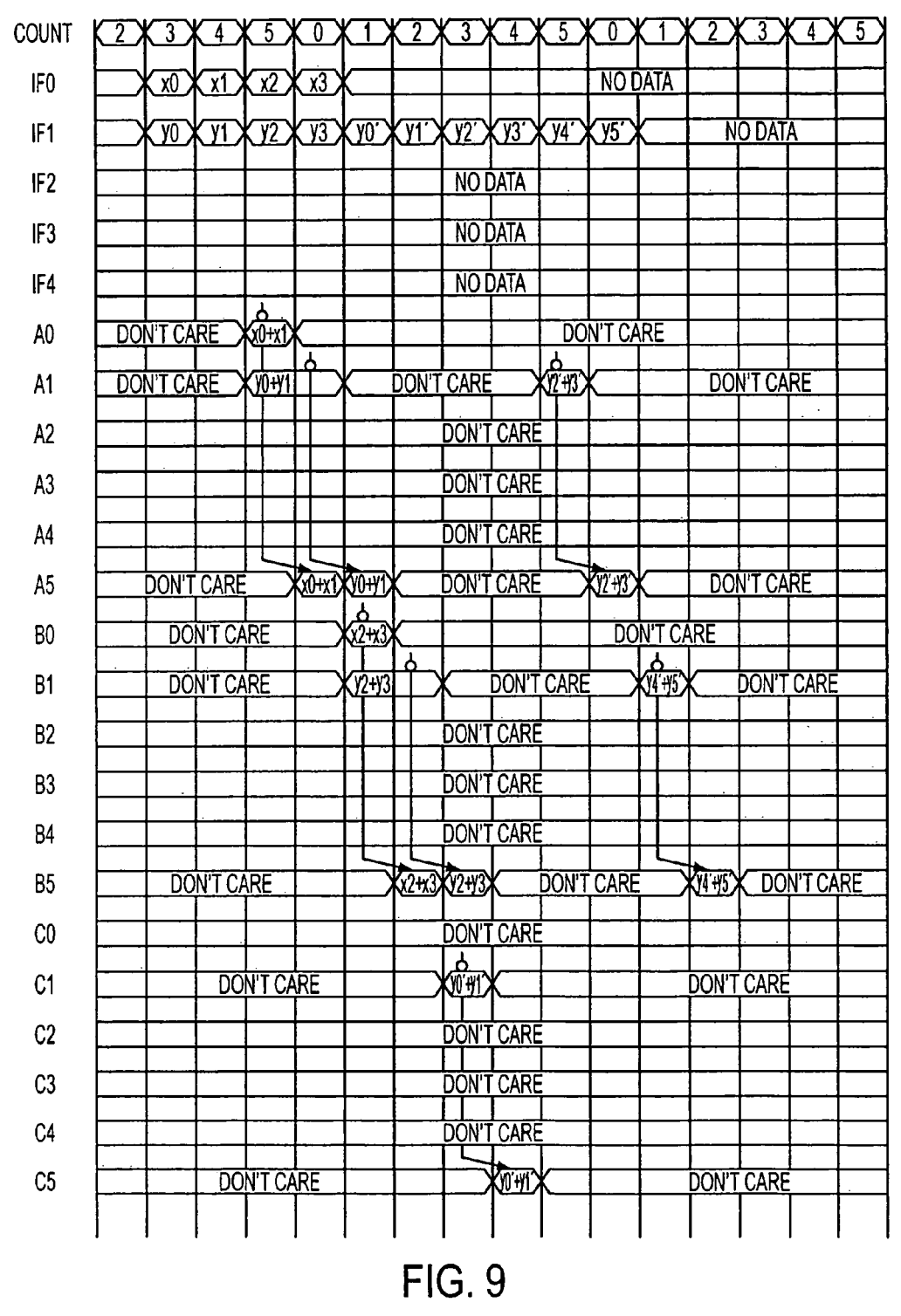

FIG. 9 is a diagram illustrating an example of a timing chart according to at least one embodiment of the invention. In the timing example, the four packet data of 4-byte width are continuously inputted to the IF 0, while 10 packet data of 4 byte width are inputted continuously to the IF 1, as illustrated. For simplifying the timing chart, no data is inputted to IF 2 to IF 4. The COUNT column indicates a count value of the counter circuit within the first priority control circuit (PRIORITY CONTROL-1) 681 in FIG. 1, while the IF0 to IF5 columns indicate respectively the input/output interfaces in FIG. 1. The A0 to A5, B0 to B5, and C0 to C5 columns indicate respectively contents stored in the sustaining buffer and write data buffer.

For example, the data x0 and x1 which are two packet data of 4-byte width inputted from the IF0 are coupled and stored in the sustaining buffer A0 as the coupled packet data x0+x1 while the COUNT=5. In the same manner, the data y0 and y1 as the two packet data of 4-byte width inputted from the IF1 are coupled and stored in the sustaining buffer A1 as the coupled packet data of y0+y1.

Moreover, in the next cycle, COUNT=0, outputs of the sustaining buffers A0 and A1 compete in the multiplexer circuit (MUX0) 651 of FIG. 6, but the coupled packet data x0+x1 is stored in the write buffer A5 under the priority control of the first priority control circuit (PRIORITY CONTROL-1) 681 in FIG. 1.

Moreover, in the next cycle, COUNT=1, the coupled packet data x0+x1 stored in the write buffer A5 is stored to the RAM (RAM-0) 653 in FIG. 1. In addition, the coupled packet data y0+y1 stored in the buffer A1 is stored in the write buffer A5.

In the next cycle, COUNT=2, the coupled packet data y0+y1 stored in the write buffer A5 is stored into the RAM (RAM-0) 653 as the data queue in FIG. 1.

The data x2 and x3 as the subsequent packet data of 4-byte width in the IF0 and the data y2, y3, y0' to y5' as the subsequent packet data of 4-byte width in the IF1 are also stored, under similar control, to the RAM (RAM-0) 653, RAM (RAM-1) 663, or RAM (RAM-2) 673, as the data queues in FIG. 6.

FIG. 10 illustrates a storing image of data packets of the RAM (RAM-0) 653, RAM (RAM-1) 663 and RAM (RAM-2) 673 after completion of the operation of FIG. 9 as an example of the timing chart according to at least one embodiment.

Figure 11:
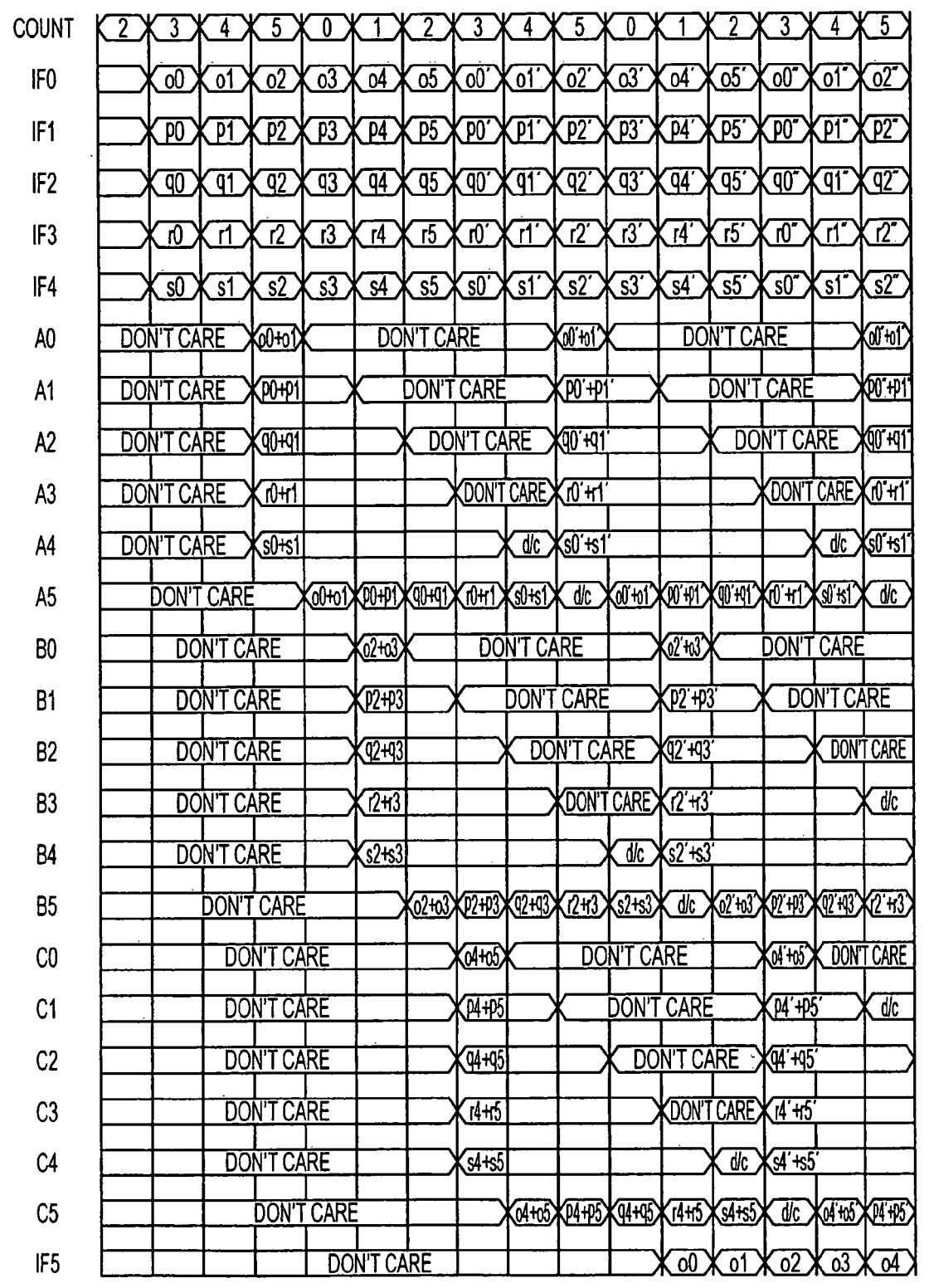

FIG. 11 is a diagram illustrating another example of the timing chart in the first embodiment. This timing example corresponds to the case where the packet data of 4-byte width is continuously inputted to the IF0 to IF4 without intermission. The COUNT column, IF0 to IF5 column, A0 to A5, B0 to B5, and C0 to C5 columns respectively indicate the contents, similar to that in FIG. 9. According to the timing chart of FIG. 11, it can be understood that even when the packet data of 4-byte width is continuously inputted without intermission to the IF0 to IF4 as the total input interfaces, the data is stored to the data queues RAM (RAM-0) 653, RAM (RAM-1) 663, or RAM (RAM-2) 673 because the priority control is executed normally.

FIG. 12 illustrates a storing image of data packet of the RAM (RAM-0) 653, RAM (RAM-1) 663, and RAM (RAM-2) 673 after completion of operations in FIG. 10, which is another example of the timing chart according to at least one embodiment.

Alternative Embodiment

Figure 13:
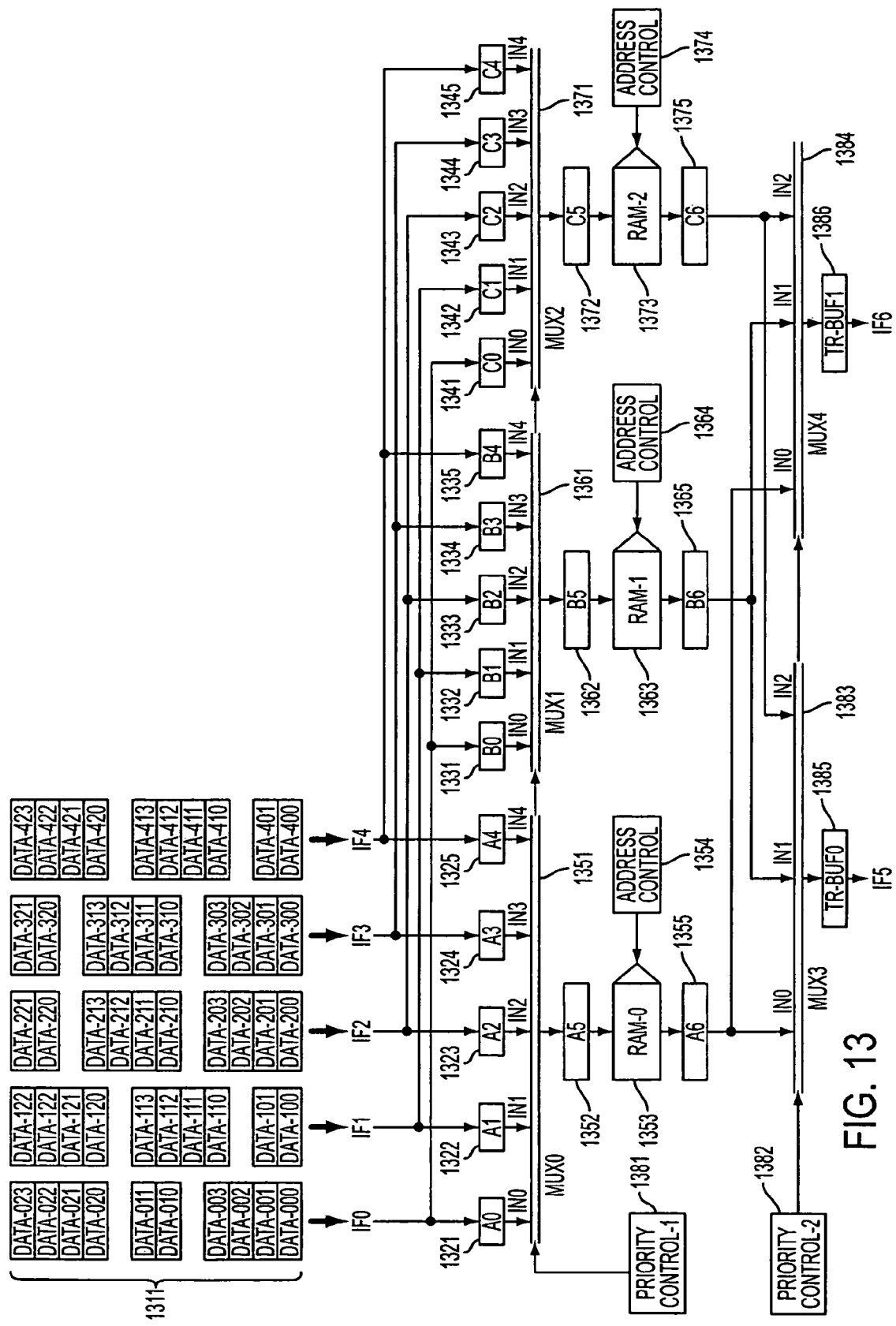
FIG. 13 is a diagram illustrating a second embodiment of the present invention.

FIG. 13 illustrates an alternate embodiment of the data queue controlling apparatus of the present invention in which a plurality of interfaces of identical type are comprised.

The data queue controlling apparatus of FIG. 13 includes, as the input, the interfaces of identical type IF0 to IF4 to respectively receive the packet data of 4-byte width 1311 outputted from the other LSI and provide an output to the output interface IF5.

The packet data of 4-byte width 1311 inputted to each interface IF0 to IF4 is coupled, whenever the data reaches 8 bytes, to the packet data of 8-byte width in which the even numbered packet data and following odd number packet data are arranged with the sustaining buffers 1321 to 1325, 1331 to 1335, and 1341 to 1345. For example, the packet data inputted to the IF0 is coupled, whenever the data reaches 8 bytes, to the packet data of 8-byte width in the sequence of the sustaining buffer (A0) 1321 sustaining buffer (B0) 1331 sustaining buffer (C0) 1341. Details of the sustaining buffers will be described herein below.

As an example, a header of the packet destination information or the like can be mounted or allocated to the even numbered packet data. The data itself of the packet data is mounted to the subsequent odd numbered packet data as a format to form the two packet data of 4-byte width. The control required after the packet data is read from the data queue can be realized easily by storing the data after the data is coupled to the packet data of 8-byte width.

The coupled packet data of 8-byte width is respectively inputted to the IN0 to IN4 of the multiplexer circuit (MUX0) 1351, multiplexer circuit (MUX1) 1361, and multiplexer circuit (MUX2) 1371. The multiplexer circuit (MUX0) 1351, multiplexer circuit (MU1) 1361, and multiplexer circuit (MUX2) 1 371 respectively select the coupled packet data inputted from the IN0 to IN4 of the respective multiplexer circuit with the select signal outputted from the first priority control circuit (PRIORITY CONTROL-1) 1381. The multiplexer circuits respectively provide the outputs to the write data buffer (A5) 1352 or write data buffer (B5) 1362 or write data buffer (C5) 1372.

Here, the first priority control circuit (PRIORITY CONTROL-1) 1381 executes priority control based on the round robin method by utilizing a counter circuit.

For example, in this method, the multiplexer circuit (MUX0) 1351 selects an input as IN0→IN1→IN2→IN3→IN4→(Non-selection)→IN0 as the count value changes to 0→1→2→3→4→5→0. Moreover, the multiplexer circuit (MUX1) 1361 selects an input as IN2→IN3→IN4→(Non-selection)→IN0→IN1→IN2 as the count value changes to 0 1→2→3→4→5→0. Moreover, the multiplexer circuit (MUX2) selects an input as IN4→(Non-selection)→IN0→IN1→IN2→IN3→IN4 as the count value changes to 0→1→2→3→4→5→0.

The coupled packet data stored in the write data buffer (A5) 1352, write data buffer (B5) 1362, and write data buffer (C5) 1372 is respectively stored to the data queue RAM (RAM-0) 1353 or RAM (RAM-1) 1363 or RAM (RAM-2) 1373 by writing the packet data to the write addresses outputted from the address control circuits 1354, 1364, 1374.

The coupled packet data stored in the RAM (RAM-0) 1353, RAM (RAM-1) 1363 and RAM (RAM-2) 1373 is respectively held in a read data buffer (A6) 1355, or read data buffer (B6) 1365, or read data buffer (C6) 1375.

The coupled packet data held in the read data buffer (A6) 1355, read data buffer (B6) 1365, or read data buffer (C6) 1375 is respectively inputted to the IN0 to IN2 of the multiplexer circuit (MUX3) 1383 and IN0 to IN2 of the multiplexer circuit (MUX4) 1384.

The multiplexer circuit (MUX3) 1383 and the multiplexer circuit (MUX4) 1384 select the coupled packet data inputted from the IN0 to IN2 with the select signal outputted from the second priority control circuit (PRIORITY CONTROL-2) and provide an output to the transforming buffer (TR-BUF0) 1385 or transforming buffer (TR-BUF1) 1386.

Here, the second priority control circuit (PRIORITY CONTROL-2) 1382 executes the priority control based on the round robin method by utilizing a counter circuit.

For example, the multiplexer circuit (MUX3) 1383 selects an input as IN0→IN1→IN2→(Non-selection)→IN0 when the count value changes to 0→1→2→3→0. Moreover, the multiplexer circuit (MUX4) 1385 selects an input as IN1→IN2→(Non-selection)→IN0→IN1 when the count value changes to 0→1→2→3→0.

Moreover, after conversion to the two packet data of 4-byte width of the coupled packet data in the transforming buffer (TR-BUF0) 1385 and transforming buffer (TR-BUF1) 1386, these packet data of 4-byte width are outputted from the IF 5 as the output interface of the data queue controlling apparatus.

With the embodiment described above, the data queue controlling apparatus including connecting relationship of n:m (n, m are natural numbers) and the controlling method thereof can be realized.

Exemplary embodiments of the present invention have been described above in detail but the practical structure of the present invention is not limited thereto and allows various changes in design within the scope of the subject matter.

What is claimed is:

1. A data queue controlling apparatus comprising:
a first plurality of input interfaces providing data;
a first plurality of buffers that receives data from the first plurality of input interfaces respectively;
a first plurality of multiplexers to receive the data from the first plurality of input interfaces and a first priority controller that selectively outputs the data stored in the first plurality of data buffers;
a plurality of sustaining buffers with each of the sustaining buffers coupled to a respective one of the first plurality of multiplexers and that concatenates a plurality of data in a packet data;
a second plurality less than the first plurality of buffers that stores the packet data from the one of the plurality of sustaining buffer groups; and
a second plurality of multiplexers and a second priority controller to selectively output the data stored in the one of the second plurality of buffers.

2. The data queue controlling apparatus described in the claim 1 further comprising M buffers, where M is a natural number equal to or larner than 2, for coupling a plurality of data groups which are respectively connected to the input interfaces to output the coupled data to respective data queue means.

3. The data queue controlling apparatus described in claim 1, including a plurality of N:1, where N is a natural number equal to or larner than 2 but equal to or less than M, selecting devices.

4. An information processing apparatus, comprising:
a data queue controlling apparatus adapted to receive data from a first plurality of interfaces;
a first plurality of buffers that receives data from the first plurality of input interfaces respectively;
a first plurality of multiplexers to receive the data from the first plurality of input interfaces and a first priority controller that selectively outputs the data stored in the first plurality of data buffers;
a plurality of sustaining buffers with each of the sustaining buffers coupled to a respective one of the first plurality of multiplexers and that couples a plurality of data in a packet data;
a second plurality less than the first plurality of buffers that stores the packet data from the one of the plurality of sustaining buffer groups;
a storing device adapted to store the received data to the second plurality less than the first plurality of data buffers; and
a second plurality of multiplexers and a second priority controller to devices selectively output the data stored in the one of the second plurality of data buffers in order to process outputs from the data queue controlling apparatus.

5. A data queue controlling method comprising:
receiving data from a first plurality of input interfaces;
storing the received data in one of a first plurality of data buffers from the first plurality of input interfaces respectively;
selectively outputting the data stored in the first plurality of data buffers;
storing the selected data in a plurality of sustaining buffers;
concatenating a plurality of data in a packet data in the one of the plurality of sustaining buffers;
storing the packet data in one of a second plurality less that the first plurality of data buffers from the one of the plurality of sustaining buffer groups; and
selectively outputting the data stored in the one of the second plurality less than the first plurality of data buffers.

* * * * *

UNITED STATES PATENT AND TRADEMARK OFFICE
CERTIFICATE OF CORRECTION

| | | |
|---|---|---|
| PATENT NO. | : 7,817,651 B2 | Page 1 of 1 |
| APPLICATION NO. | : 11/168347 | |
| DATED | : October 19, 2010 | |
| INVENTOR(S) | : Kenji Uchida | |

It is certified that error appears in the above-identified patent and that said Letters Patent is hereby corrected as shown below:

Column 12, Line 13 in Claim 2, delete "lamer" and insert --larger--, therefor.

Column 12, Line 19 in Claim 3, delete "lamer" and insert --larger--, therefor.

Signed and Sealed this
Twenty-sixth Day of April, 2011

David J. Kappos
*Director of the United States Patent and Trademark Office*